US012811232B2

(12) United States Patent
Pongratz et al.

(10) Patent No.: US 12,811,232 B2
(45) Date of Patent: Nov. 24, 2026

(54) ENERGY ACCUMULATOR HOUSING, MOTOR VEHICLE, ELECTRIC ENERGY ACCUMULATOR, AND SERIES

(71) Applicant: Bayerische Motoren Werke Aktiengesellschaft, Munich (DE)

(72) Inventors: Michael Pongratz, Munich (DE); Manuel Schurz, Landshut (DE); Marcel Sterzenbach, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 283 days.

(21) Appl. No.: 18/693,635

(22) PCT Filed: Nov. 14, 2022

(86) PCT No.: PCT/EP2022/081767
§ 371 (c)(1),
(2) Date: Mar. 20, 2024

(87) PCT Pub. No.: WO2023/104433
PCT Pub. Date: Jun. 15, 2023

(65) Prior Publication Data
US 2025/0141015 A1 May 1, 2025

(30) Foreign Application Priority Data
Dec. 8, 2021 (DE) ..................... 10 2021 132 283.9

(51) Int. Cl.
*B60K 1/04* (2019.01)
*B62D 21/03* (2006.01)
(Continued)

(52) U.S. Cl.
CPC ............. *H01M 50/249* (2021.01); *B60K 1/04* (2013.01); *B62D 21/03* (2013.01); *B62D 25/20* (2013.01);
(Continued)

(58) Field of Classification Search
CPC ........................................................ B60K 1/04
See application file for complete search history.

(56) References Cited

U.S. PATENT DOCUMENTS 11,764,431 B2 * 9/2023 Anandarajah ......... H01M 50/20 429/82
2012/0164504 A1 * 6/2012 Takashina ................ B60K 6/48 429/100
(Continued)

FOREIGN PATENT DOCUMENTS

DE 10 2018 106 399 A1 9/2019
DE 10 2018 132 171 A1 6/2020
(Continued)

OTHER PUBLICATIONS

International Search Report (PCT/ISA/210) issued in PCT Application No. PCT/EP2022/081767 dated Mar. 14, 2023 with English translation (7 pages).
(Continued)

*Primary Examiner* — Brian L Swenson
(74) *Attorney, Agent, or Firm* — Crowell & Moring LLP

(57) ABSTRACT

An energy accumulator housing, in particular a high-voltage accumulator housing for a motor vehicle, comprising a top housing part and a bottom housing part. The bottom housing part comprises a middle portion and two end portions. The middle portion comprises a base element on which wall elements are formed laterally and extend along a longitudinal axis. As a result, together with the base element, an arrangement space is formed in regions, and the end portions are arranged at the ends of the middle portion and have wall elements which also form the arrangement space. The end portions are cast parts, and the shape of the middle portion is produced by bending.

17 Claims, 1 Drawing Sheet

(51) Int. Cl.

| | |
|---|---|
| ***B62D 25/20*** | (2006.01) |
| ***H01M 50/224*** | (2021.01) |
| ***H01M 50/227*** | (2021.01) |
| ***H01M 50/231*** | (2021.01) |
| ***H01M 50/249*** | (2021.01) |

(52) U.S. Cl.

CPC ....... *H01M 50/224* (2021.01); *H01M 50/227* (2021.01); *H01M 50/231* (2021.01); *B60K 2001/0438* (2013.01); *H01M 2220/20* (2013.01)

(56) References Cited

U.S. PATENT DOCUMENTS

| | | | | |
|---|---|---|---|---|
| 2018/0138565 | A1* | 5/2018 | Lee | H01M 10/6554 |
| 2018/0183114 | A1* | 6/2018 | Rittner | H01M 50/24 |
| 2019/0217896 | A1* | 7/2019 | Otoguro | B60K 1/04 |
| 2019/0283562 | A1 | 9/2019 | Scholemann et al. | |
| 2019/0296269 | A1* | 9/2019 | Monismith | H01M 50/193 |
| 2020/0140021 | A1* | 5/2020 | Grottke | B62D 25/025 |
| 2020/0259139 | A1* | 8/2020 | Nomizo | H01M 50/209 |
| 2022/0052410 | A1* | 2/2022 | Schulz | H01M 50/231 |
| 2022/0247012 | A1* | 8/2022 | Scholemann | H01M 50/249 |
| 2022/0344739 | A1* | 10/2022 | Ishitobi | H01M 10/655 |
| 2023/0264556 | A1* | 8/2023 | Anasenzl | B60K 1/04 206/703 |
| 2023/0327257 | A1* | 10/2023 | Ishitobi | B60L 50/66 429/120 |
| 2023/0361378 | A1* | 11/2023 | Keum | H01M 10/647 |
| 2024/0120589 | A1* | 4/2024 | Danneberg | B60L 50/66 |

FOREIGN PATENT DOCUMENTS

| | | | |
|---|---|---|---|
| DE | 10 2020 201 361 | A1 | 8/2020 |
| DE | 10 2019 206 893 | A1 | 11/2020 |
| DE | 10 2019 210 400 | A1 | 1/2021 |
| DE | 10 2019 212 590 | A1 | 2/2021 |
| DE | 10 2020 105 607 | B3 | 6/2021 |
| WO | WO 2023/011864 | A1 | 2/2023 |

OTHER PUBLICATIONS

German-language Written Opinion (PCT/ISA/237) issued in PCT Application No. PCT/EP2022/081767 dated Mar. 14, 2023 with English translation (8 pages).

German-language Search Report issued in German Application No. 10 2021 132 283.9 dated Jul. 5, 2022 with partial English translation (14 pages).

* cited by examiner

ENERGY ACCUMULATOR HOUSING, MOTOR VEHICLE, ELECTRIC ENERGY ACCUMULATOR, AND SERIES

BACKGROUND AND SUMMARY

The present disclosure relates to an energy storage-device housing, in particular, a high-voltage storage-device housing for a motor vehicle, to a motor vehicle, to an electric energy storage device, and to a series of energy storage-device housings.

Energy storage-device housings of the type in question are used, for example, in partially and fully electrified motor vehicles. The batteries, or battery modules, are installed in such housings. To realize the required ranges, the storage devices, or housings, are often very large, which is not unproblematic in respect of cost-effective series production. The production of such housings is complex, partly because the housings have to fulfill stringent gas-tightness requirements. Due to the exposed location of the storage-device housings, usually in the underbody area of the vehicles, anti-corrosion protection also poses a major challenge.

It is therefore an object of the present disclosure to specify an energy storage-device housing, a motor vehicle, an electric energy storage device, and a series of energy storage-device housings that enable efficient production while at the same time fulfilling the highest quality requirements.

According to the disclosure, an energy storage-device housing, in particular, a high-voltage storage-device housing for a motor vehicle, comprises a housing upper part and a housing lower part, wherein the housing lower part has a middle portion and two end portions, wherein the middle portion comprises a base element on which wall elements are realized laterally and extend along a longitudinal axis, thereby together with the base element forming an arrangement space in regions. The end portions are arranged at the ends of the middle portion and have wall elements that contribute to shaping the arrangement space. The end portions are cast parts, and the middle portion is formed from coated steel strip. Instead of creating the anti-corrosion protection, for example, via a subsequent cathodic dip coating (CDC) of the entire housing lower part, which inter alia poses an enormous challenge due to the size of the components, here the (already) coated steel strip is used. The coating in this case is already expediently designed to provide anti-corrosion protection.

According to a particularly preferred embodiment, the end portions are formed from a material that does not require any separate anti-corrosion protection, such as, for example, an aluminum material. Advantageously, since the middle portion is formed from the coated steel strip, no further anti-corrosion measures are needed.

Preferred coating materials for the steel strip are, in particular, metals or metal alloys, as well as organic materials. The coating is expediently designed to provide anti-corrosion protection.

Metal coatings may be produced electrolytically or by hot-dip coating. Preferred metallic coating materials are: zinc and zinc alloys, aluminum, tin, lead or chromium.

Preferred organic coating materials are varnishes or polyvinyl chloride (PVC)-based foils and/or polyethylene (PE)-based films.

Expediently, the coated steel strip can be processed without impairing the coating. In particular, methods such as cutting, bending, deep-drawing, roll-forming, welding, etc. are possible without any problems.

In electrolytic coating processes, cold-rolled, already annealed and post-rolled (skin-passed) strip is preferably used as the base material. The mechanical properties of the primary material are no longer altered by the surface finishing process.

Unannealed, cold-rolled strip is preferably used in hot-dip coating processes. The annealing process (recrystallisation) required to achieve the technological properties takes place in a continuous furnace upstream of the coating process. Alternatively, hot-rolled, pickled strip may also be used. In this case, the hot-rolled strip surface has a somewhat high degree of roughness.

The base material for the organic coating process is preferably steel strip that, according to one embodiment, is already metallically coated and has a corresponding corrosion resistance. According to one embodiment, cold-rolled, electrolytically or hot-dip coated strip is cleaned in a continuous work process, chemically pretreated and coated by rolling application of liquid, organic coating materials, with subsequent heat drying, or heat cross-linking, or by lamination of plastic films.

In its initial state, the coated steel strip is preferably in the form of a (large) coil, sheet or roll. According to one embodiment, the middle portion may also be assembled from or composed of a plurality of steel strip portions.

The shape of the middle portion is preferably created by bending. The arrangement space is expediently closed upwardly by the housing upper part, which is fastened to the housing lower part in a suitable manner. Advantageously, the middle portion formed by bending and the cast end portions make it possible to achieve a substantially cuboid arrangement space. Such a cuboid arrangement space, which has no large radii etc., makes it possible to achieve a maximum transport volume. In other words, a large number of energy storage-device cells can thus be arranged, as disruptive radii such as, for example, those that occur in the case of deep-drawing, can be avoided in the case of bending or, in particular, folding.

According to a preferred embodiment, the steel strip is bent in a suitable manner or, in particular, shaped by bending, or folded accordingly. The middle portion may also be referred to as the folded portion. The wall elements extend vertically, or substantially vertically, away from the base element.

According to one embodiment, flange elements, preferably orientated parallel to the base element, are realized adjoining the wall elements. These preferably extend, parallel to the base element, away from the arrangement space, thus forming a flange or flange region. Advantageously, the flange elements, which in particular are formed circumferentially and which are realized both on the middle portion and on the end portions, form a circumferential flange region. Expediently, the housing upper part is fastened to the housing lower part, in particular in a gas-tight manner, in a form-fitting and/or force-fitting manner. Expediently, the fastening, or connection, is designed so that it can be undone. Preferred fastening includes screw and/or rivet connections. Due to the process, the bent or, in particular, folded middle portion, comprising the wall elements and the adjoining flange sections, has a very high dimensional stability. In particular, the flatness of the surfaces is to be emphasized in this regard. The flange elements in particular are very flat and not at all undulating, as would be the case, for example, with deep-drawing of such a structure. Flange elements that are not dimensionally stable or that, in particular, are undulating would prevent the housing upper part from being arranged in a tight manner, or would at least make this more difficult.

For the purpose of fastening the housing upper part, there are one or more fastening elements realized on the flange elements, or on the flange region. These may be appropriately designed cutouts or holes that serve to arrange fasteners such as screws. Furthermore, the flange elements, or the flange region, also serve to fasten the energy storage-device housing in or to the respective motor vehicle. For example, the flange elements, in particular the lateral flange elements, or the corresponding flange regions, are used to fasten the energy storage-device housing to the side members of the motor vehicle.

According to a preferred embodiment, the end portions are produced as one part, in particular by die casting. Expediently, the end portions are made of a metal material, in particular a light metal such as, for example, an aluminum alloy. Alternatively, production from a plastic or, in particular, a composite material is also preferred, or possible. When the energy storage-device housing has been installed in the motor vehicle, there is a front portion and a rear end portion, with respect to the direction of travel. The front and rear end portions may be identical in design. Typically, however, they differ at least slightly, as they have or realize different attachment points. Irrespective of this, they may initially be produced, expediently, as one part. To produce the two end portions, this one part, which according to a preferred embodiment is a die-cast component, is separated mechanically. Sawing, for example, is a preferred method of separation in this case.

Expediently, the end portions include wall elements, as they contribute to shaping the arrangement space. Preferably, but not necessarily, they also have flange elements. Expediently, they are thus designed to continue, or complete, a shape or geometry of the middle portion. According to a preferred embodiment, the end portions also have base elements.

According to one embodiment, the end portions are connected in a materially bonded manner to the middle portion along a joining plane, wherein the joining plane is sealed. According to a preferred embodiment, the end portions are connected in a form-fitting and/or force-fitting manner, in particular screwed and/or riveted, to the middle portion.

According to a particularly preferred embodiment, the end portions are fastened to the middle portion via a fusion welding process, in particular via MIG welding (metal inert gas welding). This process can be implemented reliably and is cost-effective. The tightness, in particular gas tightness, is preferably produced afterward at this site, or along the weld seam, via a sealing material applied to the connection point or joining point. The application is effected, for example, in bead form, along the weld seam, on one or both sides.

According to a preferred embodiment, the joining regions are sealed afterward, or the joining plane is sealed afterward, with a sealing material being used for this purpose. According to a preferred embodiment, the sealing material is selected from one of the following materials: silane-modified polymer, 2-component polyurea, and/or polyvinyl chloride. It has been found that the aforementioned materials, in particular with regard to the application on, preferably bare, aluminum material, provide optimum fluid tightness, in particular gas tightness. The use of a sealing material made of or based on silane-modified polymers or a silane-modified polymer is particularly preferred.

The design makes it possible, advantageously, to create a complete housing lower part based on just a few components. The housing lower part in this case has a base element that, when the energy storage-device housing is in the installed state, is orientated substantially parallel to the plane of the road surface. The wall elements extend substantially perpendicularly away from the base element (upward in relation to the plane of the road surface or plane of the ground). Together with the end portions, this results in a circumferentially closed arrangement space.

According to a preferred embodiment, the joining plane is orientated so as to be flat, or perpendicular, with respect to the base element. On the one hand, this makes it easier to fasten the end portions to the middle portion, as it is only necessary to work along one line. At the same time, any subsequent sealing is also made easier, as no complicated geometries need to be sealed here either. In combination with the preferred production of the end portions as one part, further advantages can be achieved, as the two parts also have an expediently straight, or flat, parting plane.

Particularly preferably, the arrangement space is realized without any barrier. Expediently, there are thus no further elements, whether transverse elements or longitudinal elements, provided in the arrangement space for stiffening, etc. The space can be used entirely to accommodate a greatest possible number of energy storage-device cells. Expediently, there is a multiplicity of energy storage-device cells arranged in the arrangement space so as to fill the space. Preferred types of housing cells are, for example, prismatic cells or, in particular, round cells that are expediently arranged, in particular, in an upright manner, possibly also in a plurality of planes.

The disclosure also relates to a motor vehicle, comprising a forebody and an afterbody that are connected via longitudinal elements, and wherein an energy storage-device housing according to the disclosure is fastened to the longitudinal elements, in particular in a load-free manner. Expediently, the forebody and the afterbody in combination with the longitudinal elements form the supporting structure, while the energy storage-device housing is merely arranged on this structure in a load-free manner or, in particular, is fastened, for example, in a form-fitting and/or force-fitting manner, in particular also detachably. In other words, the energy storage-device housing does not have to take up any forces. Instead, the energy storage-device housing may be designed primarily to accommodate as many energy storage-device cells as possible.

According to a preferred embodiment, the housing upper part of the energy storage-device housing forms a floor of the vehicle interior.

According to a preferred embodiment, there are cross members arranged, in particular in a form-fitting and/or force-fitting manner, for example via screw connections, on the housing upper part, wherein the cross members are designed for seat rail fastening. The cross members are also called seat cross members. Expediently, the seat cross members are connected to, or fastened to, the longitudinal elements. This allows the aforementioned structure to be stiffened in the transverse direction in the region of the energy storage-device housing. Expediently, however, this is not via the energy storage-device housing itself, but via the cross members, to which the energy storage-device housing is fastened only via its housing upper part, which, as mentioned, preferably forms the floor of the vehicle interior.

The disclosure also relates to an electric energy storage device, in particular a high-voltage storage device, that comprises an energy storage-device housing according to the disclosure. Such an electric energy storage device comprises a multiplicity of electric energy storage-device cells, in the present case for example lithium-ion cells, lithium-sulfur cells, iron phosphate cells etc. However, energy storage-device cells may also be capacitors or supercapacitors. According to one embodiment, the energy storage-device cells are combined to form modules, in particular battery modules. An energy storage device comprises, for example, a multiplicity of such battery modules.

According to a preferred embodiment, such a modular structure is not used. Instead, the energy storage-device cells are arranged directly in the arrangement space, the barrier-free arrangement space proposed here, substantially formed by the three parts, namely middle portion, front and rear end portion, offering major advantages with regard to the possible arrangement volume. In particular, the absence of internal cross members or side members should be mentioned here as a particular advantage. The same applies to the very small radii that can be achieved by bending or folding, which enable optimum utilization of space.

The disclosure also relates to a series of energy storage-device housings, comprising a multiplicity of energy storage-device housings according to the disclosure, wherein the width and length of the energy storage-device housings are adapted via correspondingly shaped, in particular bent, middle portions. According to one embodiment, the middle portions differ only in their length. The end portions are preferably identical parts within the series of this embodiment. As already mentioned, the front and rear end portions are expediently realized differently in each case. Expediently, however, the respective front end portions and the respective rear end portions are identical or substantially identical within the series. This does not prevent, for example, drilled holes or the like from being made afterward, allowing the end portions to be customized as required. The basic components are expediently the same in each case, which means that energy storage-device housings of different sizes can be provided reliably and cost-effectively for use in vehicles of different sizes.

Alternatively, the middle portions are additionally or alternatively of different widths. This can be realized with little effort, as they are shaped by bending or, in particular, folding. The end portions are correspondingly wider or narrower. This can also be realized with little effort.

BRIEF DESCRIPTION OF THE DRAWINGS

Further advantages and features are given by the following description of embodiments of energy storage-device housings with reference to the appended figures.

DETAILED DESCRIPTION OF THE DRAWINGS

Figure 1:
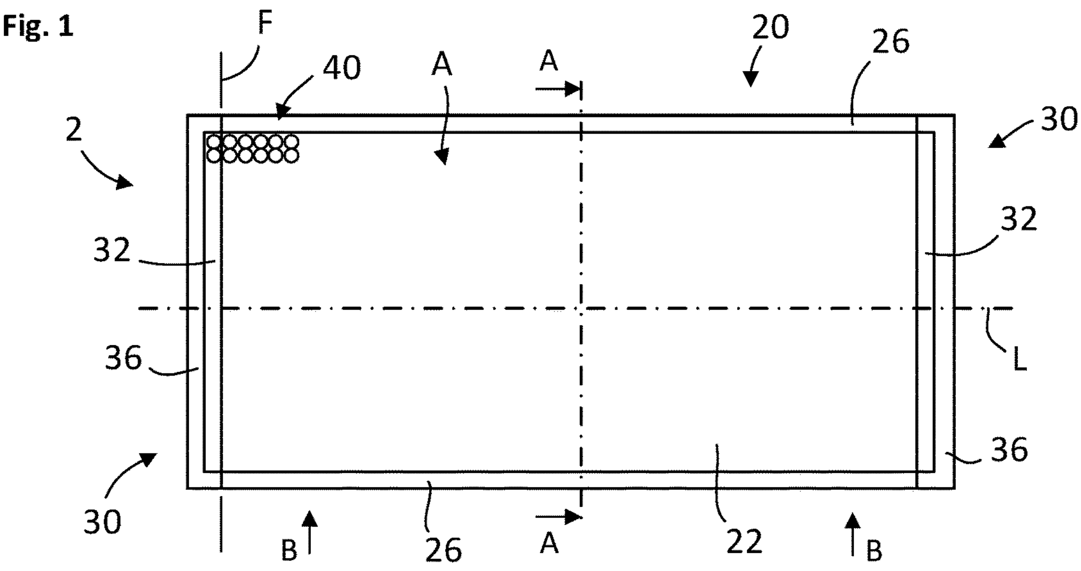
FIG. 1: shows a top view of an embodiment of a housing lower part.

Shown in a schematic representation in FIG. 1 is a top view of a housing lower part 2 of an energy storage-device housing. It shows a middle portion 20 that extends along a longitudinal direction L, with an end portion 30 arranged at each end. The middle portion 20 has a base element 22. In the present case, the end portions 30 are also shaped such that they have base elements 32. In combination with wall elements, that in the present case are orientated, as it were, perpendicularly with respect to the plane of the drawing, a substantially cuboid arrangement space A is formed. This serves expediently to accommodate a greatest possible number of energy storage-device cells 40. These are represented here as round cells. The end portions 30 are each fastened to the middle portion 20 along a joining region, or a joining plane F. This joining plane is expediently planar, or flat. In the present case, it is also substantially perpendicular to the drawing plane. The end portions 30 and the middle portion 20 form a circumferential flange region that is formed by flange elements 26 and 36 respectively. The section A-A and the view B-B are represented in FIGS. 2 and 3.

Figure 2:
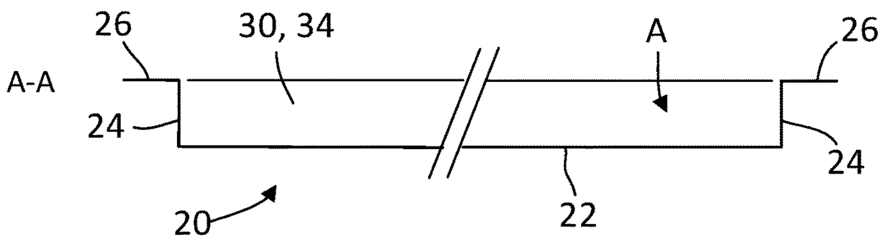
FIG. 2: shows a section, as indicated in FIG. 1.

FIG. 2 shows the section A-A indicated in FIG. 1. In particular, a shape of the middle portion 20 can be seen here in cross-section. The figure shows the base element 22, from which the two wall elements 24 extend vertically upward, the flange elements 26 in turn expediently extending from them, parallel to the base element 22. Such a geometry can be realized reliably and effectively via a bending process. The middle portion 20 is advantageously shaped from coated steel strip. The end portion 30, which is advantageously cast, and its wall element 34 can be seen in the background. In particular, bending, or folding, has the advantage here that the flange elements 26 have a good flatness. In the case of deep-drawing of such structures, the problem arises that the flange elements are too undulating. This causes problems in arranging the housing upper part, as the required tightness cannot usually be easily achieved.

Figure 3:
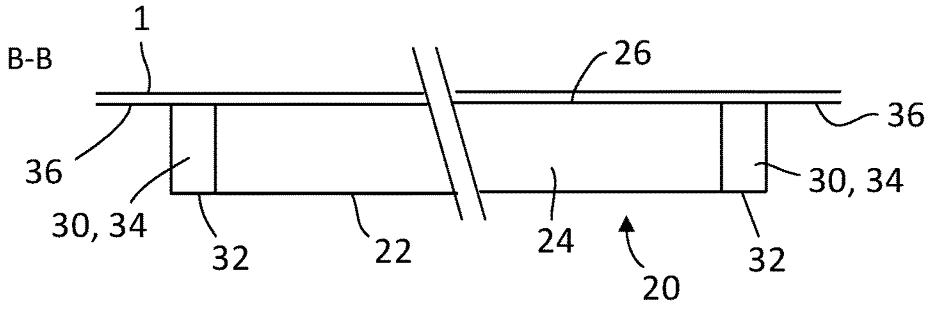
FIG. 3: shows a side view of the housing lower part known from FIG. 1, as indicated in FIG. 1; and, FIG. 4: shows a top view of a housing lower part in the installed state.

FIG. 3 shows the view B-B indicated in FIG. 1. Represented here, in particular, is a schematic side view of the housing lower part 2 indicated in FIG. 1. In particular, it can be seen here how the end portions 30 also each realize wall elements 34, or a base element 32. It can be seen that the end portions 30 continue, as it were, the geometry of the middle portion 20. The reference designation 1 denotes a housing upper part that is arranged, or can be arranged, on the flange elements 26, or 36.

Figure 4:
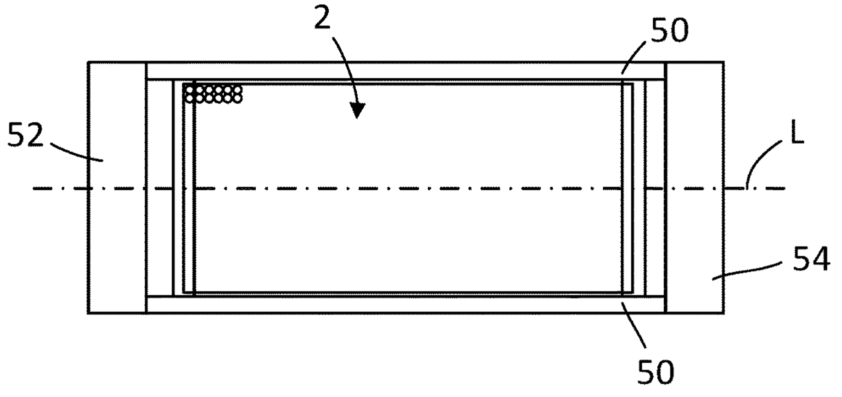

FIG. 4 shows a schematic view of a housing lower part 2 in the installed state. A motor vehicle is indicated here by a forebody 52 and an afterbody 54, which are connected via longitudinal elements 50. The diagram is intended to illustrate that the energy storage-device housing is expediently fastened in a load-free manner within this structure. The energy storage-device housing expediently does not have to take up any loads. According to a preferred embodiment, a housing upper part of the energy storage-device housing, not represented here, forms a floor of a passenger compartment. According to a preferred embodiment, the longitudinal elements 50 are connected, in the region of the energy storage-device housing, via at least one transverse element that is orientated transversely with respect to the represented longitudinal axis L, and the structure may additionally be stiffened in the region of the energy storage-device housing. However, this is not via the energy storage-device housing. Expediently, the energy storage-device housing is fastened via its housing upper part to the at least one transverse element. Advantageously, a plurality of such transverse elements are provided. Expediently, the transverse elements serve as fastening points for the seat rails.

LIST OF REFERENCE DESIGNATIONS

1 housing upper part
2 housing lower part
20 middle portion
22 base element

24 wall element
26 flange element
30 end portion
32 base element
34 wall element
26 flange element
40 energy storage-device cell
50 longitudinal element
52 forebody
54 afterbody
A arrangement space
F joining plane
L longitudinal axis

What is claimed is:

1. An energy storage-device housing, comprising a high-voltage storage-device housing for a motor vehicle, comprising:

a housing upper part and a housing lower part, wherein the housing lower part has a middle portion and two end portions, wherein the middle portion comprises a base element on which wall elements are realized laterally and extend along a longitudinal axis, thereby together with the base element forming an arrangement space in a region, and wherein the end portions are arranged at the ends of the middle portion and have wall elements that contribute to shaping the arrangement space, wherein the end portions are cast parts, wherein the middle portion is formed from coated steel strip, and wherein the end portions each have a base element and wall elements that continue the geometry of the middle portion.

2. The energy storage-device housing according to claim 1, wherein the coating is formed by a metal, a metal alloy, and/or an organic material.

3. The energy storage-device housing according to claim 1, wherein the shape of the middle portion is created by bending.

4. The energy storage-device housing according to claim 1, wherein flange elements, orientated parallel to the base element, are realized adjoining the wall elements and extend, parallel to the base element, away from the arrangement space.

5. The energy storage-device housing according to claim 4, wherein the housing upper part is fastened to the wall elements and/or to the flange elements.

6. The energy storage-device housing according to claim 1, wherein the end portions are produced as one part.

7. The energy storage-device housing according to claim 1, wherein the end portions are connected in a materially bonded manner to the middle portion along a joining plane, and wherein the joining plane is sealed.

8. The energy storage-device housing according to claim 7, wherein the joining plane is orientated so as to be flat and perpendicular with respect to the base element.

9. The energy storage-device housing according to claim 7, wherein the joining plane is sealed with a sealing material selected from silane-modified polymer, 2-component polyurea, and/or polyvinyl chloride.

10. The energy storage-device housing according claim 1, wherein the arrangement space is realized without any barrier, and wherein there is a multiplicity of energy storage-device cells arranged in the arrangement space so as to fill the space.

11. A motor vehicle, comprising a forebody and an afterbody that are connected via longitudinal elements, and wherein an energy storage-device housing according to claim 1 is fastened to the longitudinal elements.

12. The motor vehicle according to claim 11, wherein the housing upper part of the energy storage-device housing forms a floor of the vehicle interior.

13. A high-voltage storage device comprising an energy storage-device housing according to claim 1.

14. The energy storage-device housing according to claim 1, wherein the end portions are formed from an aluminum material.

15. The energy storage-device housing according to claim 1, wherein the end portions are fastened to the middle portion by a fusion welding process.

16. The energy storage-device housing according to claim 1, wherein the housing upper part is fastened to the housing lower part in a gas-tight manner.

17. An energy storage-device housing, comprising a high-voltage storage-device housing for a motor vehicle, comprising:

a housing upper part and a housing lower part, wherein the housing lower part has a middle portion and two end portions, wherein the middle portion comprises a base element on which wall elements are realized laterally and extend along a longitudinal axis, thereby together with the base element forming an arrangement space in a region, and wherein the end portions are arranged at the ends of the middle portion and have wall elements that contribute to shaping the arrangement space, wherein the end portions are cast parts, wherein the middle portion is formed from coated steel strip, wherein flange elements, orientated parallel to the base element, are realized adjoining the wall elements and extend, parallel to the base element, away from the arrangement space, and wherein the flange elements form a circumferential flange region on the middle portion and the end portions.

* * * * *